US012425827B2

(12) United States Patent
Chen et al.

(10) Patent No.: US 12,425,827 B2
(45) Date of Patent: Sep. 23, 2025

(54) MANAGING PROCESSING OF A BASIC SAFETY MESSAGE

(71) Applicant: QUALCOMM Incorporated, San Diego, CA (US)

(72) Inventors: Cong Chen, Shrewsbury, MA (US); Jonathan Petit, Wenham, MA (US); Jean-Philippe Monteuuis, Northborough, MA (US); Mohammad Raashid Ansari, Lowell, MA (US)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 17/804,108

(22) Filed: May 26, 2022

(65) Prior Publication Data

US 2023/0388765 A1    Nov. 30, 2023

(51) Int. Cl.
*H04W 4/40* (2018.01)
*H04W 4/12* (2009.01)
*H04W 4/90* (2018.01)
*H04W 12/122* (2021.01)

(52) U.S. Cl.
CPC ............... *H04W 4/90* (2018.02); *H04W 4/12* (2013.01); *H04W 4/40* (2018.02); *H04W 12/122* (2021.01)

(58) Field of Classification Search
CPC ....... H04W 4/90; H04W 4/40; H04W 12/122; H04W 4/12
USPC ......................................................... 370/329
See application file for complete search history.

(56) References Cited

U.S. PATENT DOCUMENTS

| | | | |
|---|---|---|---|
| 2011/0140968 A1* | 6/2011 | Bai | G08G 1/163 342/454 |
| 2011/0304425 A1 | 12/2011 | Iyer et al. | |
| 2015/0138975 A1* | 5/2015 | Gotz | G08G 1/093 370/235 |
| 2015/0271185 A1* | 9/2015 | Rommele | G06F 21/64 713/176 |
| 2018/0086263 A1 | 3/2018 | Moradi-Pari et al. | |
| 2018/0097637 A1* | 4/2018 | Weinfield | H04W 4/12 |
| 2018/0102054 A1 | 4/2018 | Naserian et al. | |
| 2019/0349802 A1 | 11/2019 | Weinfield et al. | |
| 2020/0104208 A1* | 4/2020 | Heo | G06F 3/0619 |
| 2020/0139980 A1 | 5/2020 | Liu et al. | |
| 2020/0382922 A1* | 12/2020 | Park | H04W 4/46 |
| 2021/0314748 A1* | 10/2021 | Cominetti | H04W 12/069 |
| 2022/0024476 A1 | 1/2022 | Lund et al. | |
| 2022/0028264 A1 | 1/2022 | Lund et al. | |
| 2022/0030430 A1 | 1/2022 | Lund et al. | |
| 2022/0067694 A1* | 3/2022 | Solov'Ev | G06Q 20/10 |

(Continued)

OTHER PUBLICATIONS

International Search Report and Written Opinion—PCT/US2023/016703—ISA/EPO—Jun. 15, 2023 14 pages.

*Primary Examiner* — Mark G. Pannell
(74) *Attorney, Agent, or Firm* — Polsinelli

(57) ABSTRACT

Various embodiments include methods and systems for vehicle-to-everything (V2X) system of a vehicle for managing processing of a basic safety message (BSM). Various embodiments may include calculating a relevancy value of a received BSM prior to conducting security processing of the BSM, determining whether the relevancy value of the BSM meets a relevancy threshold, and stopping processing of the BSM in response to determining that the relevancy value of the BSM does not meet the relevancy threshold.

21 Claims, 10 Drawing Sheets

(56) References Cited

U.S. PATENT DOCUMENTS

| | | | |
|---|---|---|---|
| 2022/0095115 A1 | 3/2022 | Shimizu et al. | |
| 2022/0388505 A1* | 12/2022 | Sharma Banjade | ........................ G08G 1/096783 |
| 2023/0092744 A1* | 3/2023 | Xu | ...................... H04W 12/033 370/331 |
| 2023/0286520 A1* | 9/2023 | Qi | ........................... H04W 4/46 |
| 2023/0292243 A1* | 9/2023 | Mueck | .............. H04W 52/0216 |
| 2024/0007856 A1* | 1/2024 | Li | ........................ H04L 63/205 |
| 2024/0179523 A1* | 5/2024 | Tian | .................. H04W 12/0433 |

* cited by examiner

MANAGING PROCESSING OF A BASIC SAFETY MESSAGE

BACKGROUND

Vehicle-to-Everything (V2X) systems may employ protocols and messaging defined under a relevant standard, such as Cellular Vehicle-to-Everything (C-V2X), Dedicated Short Range Communication (DSRC), and ITS-G5. These standards serve as the foundation for vehicle-based wireless communications, and may be used to support intelligent highways, autonomous and semi-autonomous vehicles, and improve the overall efficiency and safety of the highway transportation systems. An element of V2X communication systems is the ability for a vehicle to broadcast V2X messages that other vehicles can receive and process to improve traffic safety, such as Basic Safety Messages (BSM) or Cooperative Awareness Messages (CAM).

V2X communication systems may be configured to detect inaccurate or intentionally false information in a BSM or CAM received from another vehicle or from Intelligent Transportation System (ITS) infrastructure devices, such as Roadside Units (RSUs). However, the processing of BSMs or CAMs to detect inaccurate or false information is computing resource intensive. Unnecessarily processing BSMs or CAMs that are irrelevant to a receiving vehicle's safety or operations consumes finite V2X computing resources.

SUMMARY

Various aspects include methods that may be performed by a processor of a vehicle-to-everything (V2X) communication system for managing processing of a basic safety message (BSM). Various aspects may include a V2X communication system processor calculating a relevancy value of a received BSM prior to conducting security processing of the BSM, determining whether the relevancy value of the BSM meets a relevancy threshold, and stopping processing of the BSM in response to determining that the relevancy value of the BSM does not meet the relevancy threshold.

Some aspects may include performing security processing of the BSM and performing a misbehavior detection operation on the BSM in response to determining that the relevancy value of the BSM meets the relevancy threshold. In some aspects, performing security processing of the BSM may include performing a cryptographic validation of the BSM. In some aspects, performing a misbehavior detection operation on the BSM may include performing a semantic validation of the BSM.

In some aspects, calculating a relevancy value for the received BSM may include calculating the relevancy value based on an inverse time-to-collision of the vehicle and a sender of the BSM. In some aspects, calculating a relevancy value for the received BSM may include calculating the relevancy value based on a relative speed of the vehicle and a sender of the BSM divided by a distance from the vehicle to the sender of the BSM. Some aspects may include determining the relevancy threshold based on a processing capability of the V2X communication system and a maneuvering capability of the vehicle. Some aspects may include determining the relevancy threshold based on a reaction time of the V2X communication system and/or a vehicle autonomous/semi-autonomous driving system and a braking time of the vehicle.

Further aspects include a vehicle processing system including a memory and a processor configured to perform operations of any of the methods summarized above. Further aspects may include a vehicle V2X communication system having various means for performing functions corresponding to any of the methods summarized above. Further aspects may include a non-transitory processor-readable storage medium having stored thereon processor-executable instructions configured to cause a processor of a vehicle V2X communication system to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
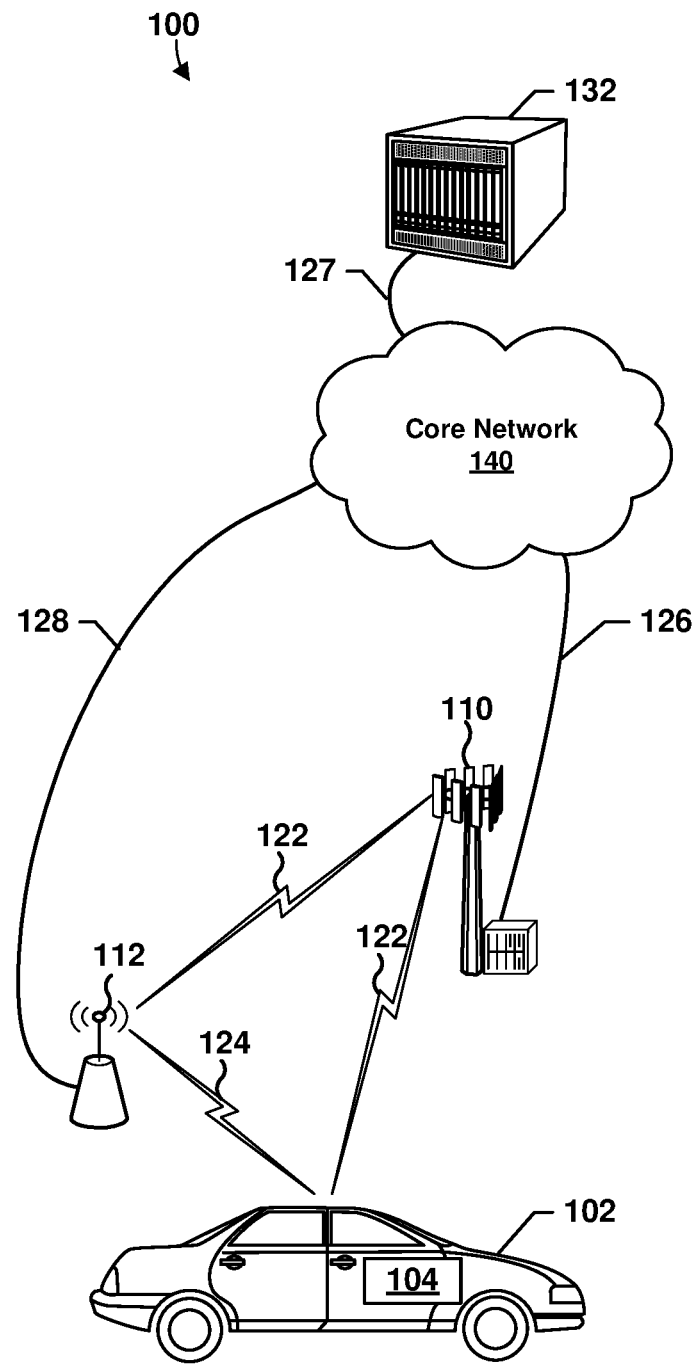
FIG. 1A is a system block diagram illustrating an example communication system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and processors of a vehicle V2X communication system for managing processing of a V2X message such as a Basic Safety Message (BSM) or Cooperative Awareness Messages (CAM) (collectively referred to herein as a "Basic Safety Message" or "BSM") such that the V2X communication system selectively performs security processing and misbehavior detection on a received BSM based on the relevancy of the received BSM to reduce computation cost and resource consumption.

As used herein, the term "vehicle" refers generally to any of an automobile, motorcycle, truck, bus, train, boat, and any other type of vehicle V2X-capable system that may be configured to manage transmission of misbehavior reports.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high-speed communication circuitry and packaged in close proximity, such as on a single motherboard or in a single wireless device. The proximity of the SOCs facilitates high speed communications and the sharing of memory and resources.

In V2X communications, V2X communication systems evaluate received BSMs by performing security processing (such as one or more cryptographic validation and/or validation operations) and one or more misbehavior detection operations to determine whether the BSMs are trustworthy and reliable (e.g., semantic validation of the BSMs, authentication operations, integrity determining operations, non-repudiation determining operations, etc.). A V2X communication system typically includes V2X vehicle systems, roadside units (RSUs), base stations, and other participants in the V2X communication system, and the volume of V2X communications may be high. Performing security processing and misbehavior detection may consume a substantial amount of computational resources of a receiving V2X communication system.

Various embodiments include a vehicle V2X communications receiving and processing system (a "V2X communication system") configured to selectively perform security processing as well as misbehavior detection processing on a BSM received by the vehicle processing system based on whether the BSM is relevant to the vehicle. In various embodiments, the V2X communication system may determine whether a received BSM rises to a level of relevance or importance such that the V2X communication system should perform security processing, semantic validation and misbehavior detection on the BSM. Technical standards for V2X communication systems typically require performing security processing on a received BSM, and then performing semantic validation and misbehavior detection on the BSM if the BSM passes the security processing operations. Various embodiments enable the V2X communication system to conserve processing resources that would otherwise be used to process BSMs that the V2X communication system determines are irrelevant to the V2X communication system. In some embodiments, the V2X communication system may calculate a relevancy value of a received BSM prior to conducting security processing and semantic validation of the BSM, determine whether the relevancy value of the BSM meets a relevancy threshold, and stop processing of the BSM before conducting security processing and semantic validation in response to determining that the relevancy value of the BSM does not meet the relevancy threshold. In some embodiments, the V2X communication system may conduct or perform security processing of the BSM and performing semantic validation and one or more misbehavior detection operations on the BSM in response to determining that the relevancy value of the BSM meets the relevancy threshold.

In some embodiments, conducting security processing of the BSM may include performing a cryptographic validation of the BSM in response to determining that the relevancy value of the BSM meets the relevancy threshold. For example, a BSM may include a digital signature or an authentication code. In some embodiments, the V2X communication system may perform a semantic validation of the BSM. For example, the V2X communication system may perform one or more operations to validate or verify the digital signature or authentication code of the BSM (e.g., performing a semantic validation of the BSM) in response to determining that the relevancy value of the BSM meets the relevancy threshold.

In some embodiments, calculating a relevancy value for the received BSM may include calculating the relevancy value based on an inverse time-to-collision of the vehicle and the sender of the BSM. In some embodiments, the V2X communication system may calculate the relevancy value based on a relative speed of the vehicle and the sender of the BSM divided by a distance from the vehicle to the sender of the BSM. For example, the V2X communication system may represent the relevancy value as $$relevancyValue = \frac{relativeSpeed}{distance}$$

in which relativeSpeed represents a relative speed of the receiving V2X communication system and the sender of the BSM, and distance represents a distance between the receiving V2X communication system and the sender of the BSM. In some embodiments, V2X communication system may determine the speed of the sender of the BSM based on a value in a speed field of the received BSM. In some embodiments, V2X communication system may determine the distance between the V2X receiver and the sender of the BSM based on a value in a position field of the received BSM, as well as location information of the V2X communication system (e.g., GPS information, base station triangulation information, location information from the V2X infrastructure such as a roadside unit (RSU), and/or the like). In some embodiments, the lower the relevancy value, the less relevant the BSM, and the less urgent the BSM is for processing by the V2X communication system; in contrast, the higher the relevancy value, the more relevant the BSM, and the more urgent the BSM is for processing by the V2X communication system.

As noted above, the V2X communication system may determine whether the relevancy value of the BSM meets a relevancy threshold. In some embodiments, the V2X communication system may determine the relevancy threshold based on a processing capability of the V2X communication system and a maneuvering capability of the vehicle. For example, the V2X communication system may determine one or more metrics or values that represent a processing speed, processing capacity, compute throughput, or another suitable value that represents the processing capability of the V2X communication system or of a vehicle autonomous/semiautonomous processing system. The V2X communication system also may determine one or more metrics or values that represent the maneuvering capability of the vehicle, such as a stopping distance, a maximum achievable deceleration rate, a maneuvering capability, a speed of the vehicle, and the like.

In some embodiments, the V2X communication system also may determine one or more values based on traffic conditions or environmental conditions in the determination of the maneuvering capability of the vehicle. For example, the maximum achievable deceleration rate may depend on a braking capability of the vehicle, and also various environmental conditions (e.g., wet or icy roads may decrease the maximum achievable deceleration rate). As another example, heavy or crowded traffic conditions may reduce the ability of the vehicle to brake or swerve safely, reducing the maneuvering capability of the vehicle.

In some embodiments, the V2X communication system may determine the relevancy threshold based on a reaction time of the V2X communication system and a braking time of the vehicle. For example, V2X communication system may represent the relevancy threshold as:

$$\alpha = \frac{c}{rt + bt}$$

in which α represents the relevancy threshold, rt represents a value of a reaction time of the V2X communication system, bt represents a value of a braking time of the vehicle, and c represents a constant that may be greater than or equal to 1. Braking time may be an amount of time required for the vehicle to come to a complete stop. In some embodiments, a braking time may be an amount of time required for the vehicle to achieve substantially zero relative speed between the V2X communication system and the sender of the BSM. In some embodiments, a braking time may be an amount of time required for the vehicle to brake sufficient to avoid a collision with the sender of the BSM.

Various embodiments may improve the operation of V2X communication systems in vehicles by enabling V2X communication systems to dynamically determine whether to use finite computing resources to perform security processing and/or one or more misbehavior detection operations on a BSM, saving the computing resources required to perform security processing of BSMs of low or no relevance to the vehicle. Various embodiments enable the V2X communication system to conserve processing resources that would otherwise be used to process BSMs that the V2X communication system determines are irrelevant to the V2X communication system.

FIG. 1A is a system block diagram illustrating an example communication system 100 suitable for implementing the various embodiments. The communications system 100 include a 5G New Radio (NR) network, an ITS V2X wireless network, and/or any other suitable network such as a Long-Term Evolution (LTE) network. References to a 5G network and 5G network elements in the following descriptions are for illustrative purposes and are not intended to be limiting.

The communications system 100 may include a heterogeneous network architecture that includes a core network 140, a number of base stations 110, and a variety of mobile devices including a vehicle 102 equipped with a V2X communication system 104 that includes wireless communication capabilities. The base station 110 may communicate with a core network 140 over a wired communication link 126. The communications system 100 also may include roadside units 112 supporting V2X communications with vehicles 102 via V2X wireless communication links 124.

A base station 110 is a network element that communicates with wireless devices (e.g., a V2X communication system 104 of the vehicle 102) via a wireless communication link 122, and may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station 110 may provide communication coverage for a particular geographic area or "cell." In 3GPP, the term "cell" can refer to a coverage area of a base station, a base station subsystem serving this coverage area, or a combination thereof, depending on the context in which the term is used. The core network 140 may be any type of core network, such as an LTE core network (e.g., an evolved packet core (EPC) network), 5G core network, a disaggregated network as described with reference to FIG. 1B, etc.

Roadside units 112 may communicate with the core network 140 via a wired or wireless communication link 128. Roadside units 112 may communicate via V2X wireless communication links 124 with V2X communication system-equipped vehicles 102 for downloading information useful for V2X communication system autonomous and semi-autonomous driving functions, and for receiving information such as misbehavior reports from the V2X communication system 104.

A Misbehavior Authority network computing device (MA) 132 may communicate with the core network 140 via a wired or wireless communication link 127. The MA 132 may receive misbehavior reports from the V2X communication system 104 as may be sent by the V2X communication system 104 from time to time.

Wireless communication links 122 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short-range RATs such as ZigBee, Bluetooth, and Bluetooth Low Energy (LE).

Figure 1B:
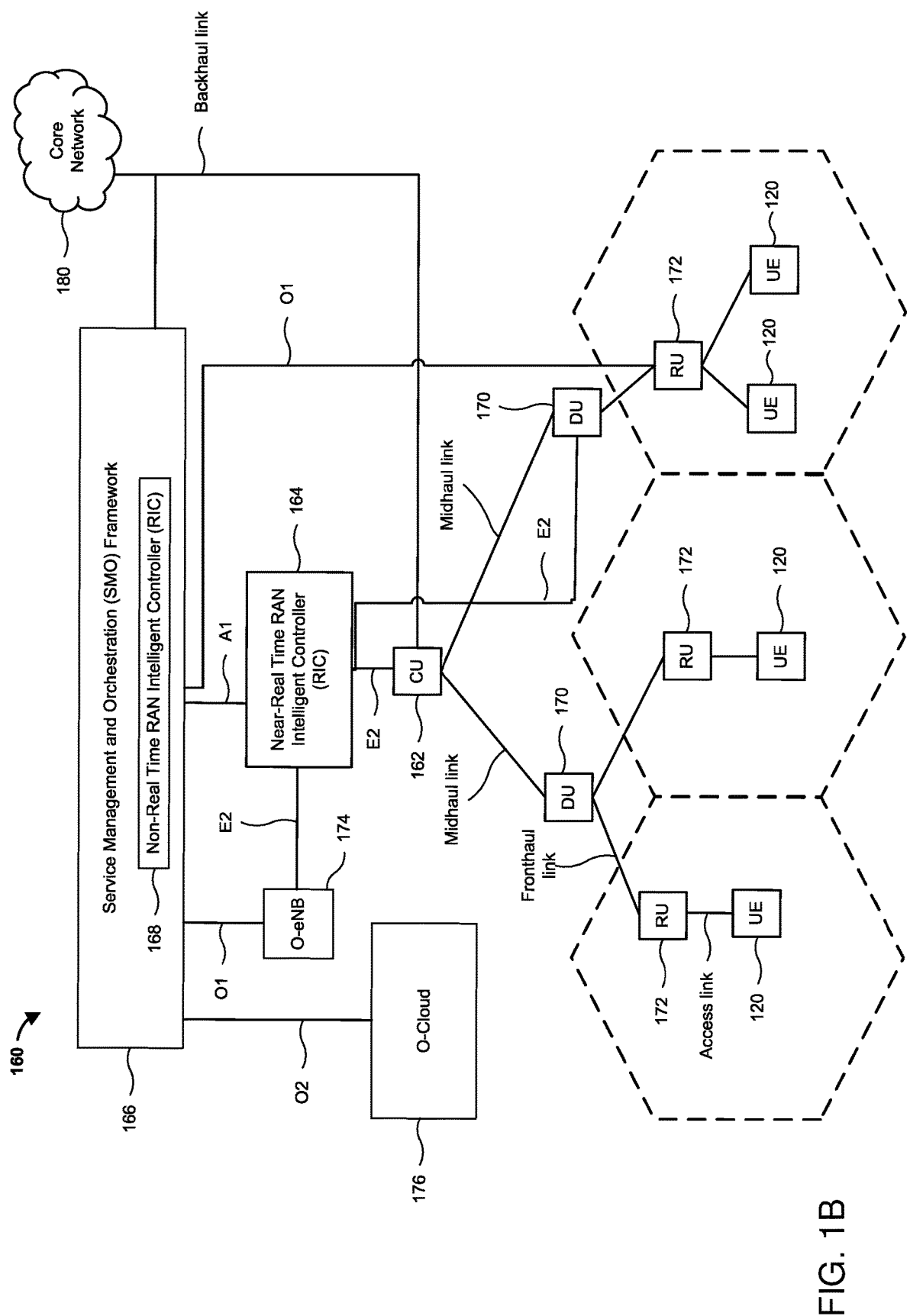
FIG. 1B is a system block diagram illustrating an example disaggregated base station architecture suitable for implementing any of the various embodiments.

FIG. 1B is a system block diagram illustrating an example disaggregated base station 160 architecture that may be part of a V2X and/or 5G network suitable for communicating map data to vehicles and communicating updated object/feature location data according to any of the various embodiments. With reference to FIGS. 1A and 1B, the disaggregated base station 160 architecture may include one or more central units (CUs) 162 that can communicate directly with a core network 180 via a backhaul link, or indirectly with the core network 180 through one or more disaggregated base station units, such as a Near-Real Time (Near-RT) RAN Intelligent Controller (RIC) 164 via an E2 link, or a Non-Real Time (Non-RT) RIC 168 associated with a Service Management and Orchestration (SMO) Framework 166, or both. A CU 162 may communicate with one or more distributed units (DUs) 170 via respective midhaul links, such as an F1 interface. The DUs 170 may communicate with one or more radio units (RUs) 172 via respective fronthaul links. The RUs 172 may communicate with respective UEs 120 via one or more radio frequency (RF) access links. In some implementations, user equipment (UE), such as a V2X communication system 104, may be simultaneously served by multiple RUs 172.

Each of the units (i.e., CUs 162, DUs 170, RUs 172), as well as the Near-RT RICs 164, the Non-RT RICs 168 and the SMO Framework 166, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 162 may host one or more higher layer control functions. Such control functions may include the radio resource control (RRC), packet data convergence protocol (PDCP), service data adaptation protocol (SDAP), or the like. Each control function may be implemented with an interface configured to communicate signals with other control functions hosted by the CU 162. The CU 162 may be configured to handle user plane functionality (i.e., Central Unit-User Plane (CU-UP)), control plane functionality (i.e., Central Unit-Control Plane (CU-CP)), or a combination thereof. In some implementations, the CU 162 can be logically split into one or more CU-UP units and one or more CU-CP units. The CU-UP unit can communicate bidirectionally with the CU-CP unit via an interface, such as the E1 interface when implemented in an O-RAN configuration. The CU 162 can be implemented to communicate with DUs 170, as necessary, for network control and signaling.

The DU 170 may correspond to a logical unit that includes one or more base station functions to control the operation of one or more RUs 172. In some aspects, the DU 170 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 170 may further host one or more low PHY layers. Each layer (or module) may be implemented with an interface configured to communicate signals with other layers (and modules) hosted by the DU 170, or with the control functions hosted by the CU 162.

Lower-layer functionality may be implemented by one or more RUs 172. In some deployments, an RU 172, controlled by a DU 170, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 172 may be implemented to handle over the air (OTA) communication with one or more UEs 120. In some implementations, real-time and non-real-time aspects of control and user plane communication with the RU(s) 172 may be controlled by the corresponding DU 170. In some scenarios, this configuration may enable the DU(s) 170 and the CU 162 to be implemented in a cloud-based radio access network (RAN) architecture, such as a vRAN architecture.

The SMO Framework 166 may be configured to support RAN deployment and provisioning of non-virtualized and virtualized network elements. For non-virtualized network elements, the SMO Framework 166 may be configured to support the deployment of dedicated physical resources for RAN coverage requirements, which may be managed via an operations and maintenance interface (such as an O1 interface). For virtualized network elements, the SMO Framework 166 may be configured to interact with a cloud computing platform (such as an open cloud (O-Cloud) 176) to perform network element life cycle management (such as to instantiate virtualized network elements) via a cloud computing platform interface (such as an O2 interface). Such virtualized network elements can include, but are not limited to, CUs 162, DUs 170, RUs 172 and Near-RT RICs 164. In some implementations, the SMO Framework 166 may communicate with a hardware aspect of a 4G RAN, such as an open eNB (O-eNB) 174, via an O1 interface. Additionally, in some implementations, the SMO Framework 166 may communicate directly with one or more RUs 172 via an O1 interface. The SMO Framework 166 also may include a Non-RT RIC 168 configured to support functionality of the SMO Framework 166.

The Non-RT RIC 168 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 164. The Non-RT RIC 168 may be coupled to or communicate with (such as via an A1 interface) the Near-RT RIC 164. The Near-RT RIC 164 may be configured to include a logical function that enables near-real-time control and optimization of RAN elements and resources via data collection and actions over an interface (such as via an E2 interface) connecting one or more CUs 162, one or more DUs 170, or both, as well as an O-eNB, with the Near-RT RIC 164.

In some implementations, to generate AI/ML models to be deployed in the Near-RT RIC 164, the Non-RT RIC 168 may receive parameters or external enrichment information from external servers. Such information may be utilized by the Near-RT RIC 164 and may be received at the SMO Framework 166 or the Non-RT RIC 168 from non-network data sources or from network functions. In some examples, the Non-RT RIC 168 or the Near-RT RIC 164 may be configured to tune RAN behavior or performance. For example, the Non-RT RIC 168 may monitor long-term trends and patterns for performance and employ AI/ML models to perform corrective actions through the SMO Framework 166 (such as reconfiguration via O1) or via creation of RAN management policies (such as A1 policies).

Figure 1C:
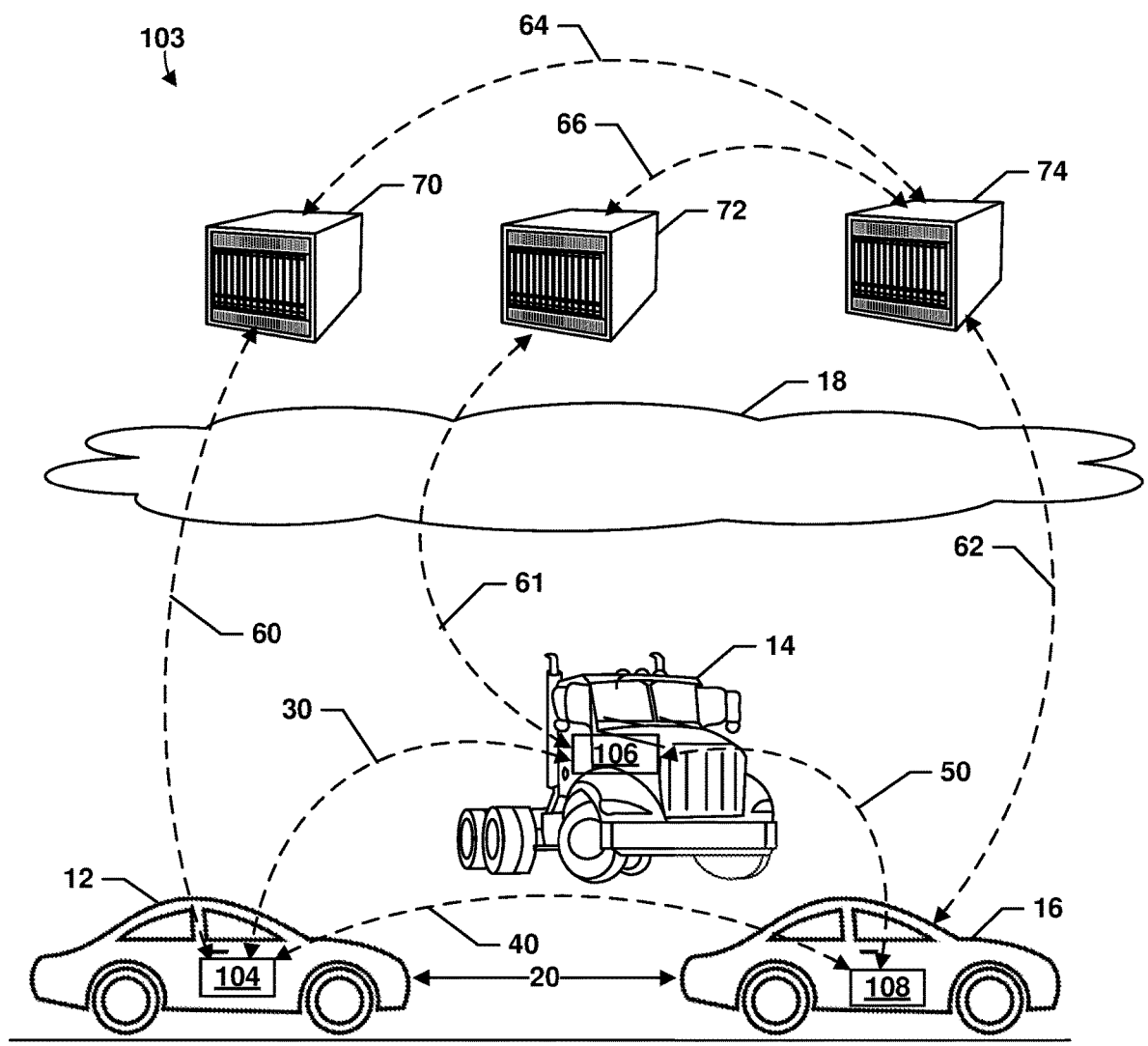
FIG. 1C is a system block diagram illustrating a communication system suitable for implementing various embodiments.

FIG. 1C is a system block diagram illustrating a communication system 103 suitable for implementing various embodiments. With reference to FIGS. 1A-1C, the communication system 103 may include three vehicles 12, 14, 16. Each vehicle 12, 14, 16 may include a V2X communication system 104, 106, 108, respectively, each configured to periodically broadcast V2X messages such as Basic Safety Messages 30, 40, 50 for receipt and processing by other vehicles' V2X communication systems (e.g., 104, 106, 108). By sharing the vehicle location, speed, direction, braking, and other information, vehicles can maintain safe separation and identify and avoid potential collisions. For example, a trailing vehicle 12 receiving Basic Safety Messages 40 from a leading vehicle 16 can determine the speed and location of the vehicle 16, which in turn enables vehicle 12 to match the speed and maintain a safe separation distance 20. By being informed through Basic Safety Messages 40 when the leading vehicles 16 applies the brakes, the V2X communication system 102 in the trailing vehicle 12 can apply brakes simultaneously to maintain the safe separation distance 20 even when the leading vehicle 16 stops suddenly. As another example, the V2X communication system 104 within the truck vehicle 14 may receive Basic Safety Messages 30, 50 from the two vehicles 12, 16, and thus be informed that the truck vehicle 14 should stop at the intersection to avoid a collision. Each of the vehicle V2X on-board equipment 104, 106, 108 may communicate with one another using any of a variety close proximity communication protocols. In addition, the vehicles may be able to transmit data and information regarding detected Basic Safety Messages as well as a misbehavior report about detected V2X misbehavior to an original equipment manufacturer (OEM) (70, 72) and/or MA 74 (e.g., 132) via communication links 60, 61, 62 through a communication network 18. The misbehavior report may be transmitted directly to the MA 74 (e.g., via communication link 64, 66). In other embodiments, the misbehavior report may first be transmitted to a misbehavior report pre-processing unit such as the OEM servers 70, 72 for pre-processing through communication links 64, 66. Then the pre-processed misbehavior report may be transmitted from the misbehavior report pre-processing servers 70, 72 to the MA 74 through communication links 64, 66. In other embodiments, a misbehavior report may be received from a vehicle, such as from vehicle 16, at the MA 74. The MA 74 may relay the received misbehavior report from the vehicle 16 onto OEM servers 70, 72 via communication links 64, 66. In addition, the OEM servers 70, 72 may provide confirmation reports to the MA 74 via communication links 64, 66.

Figure 2A:
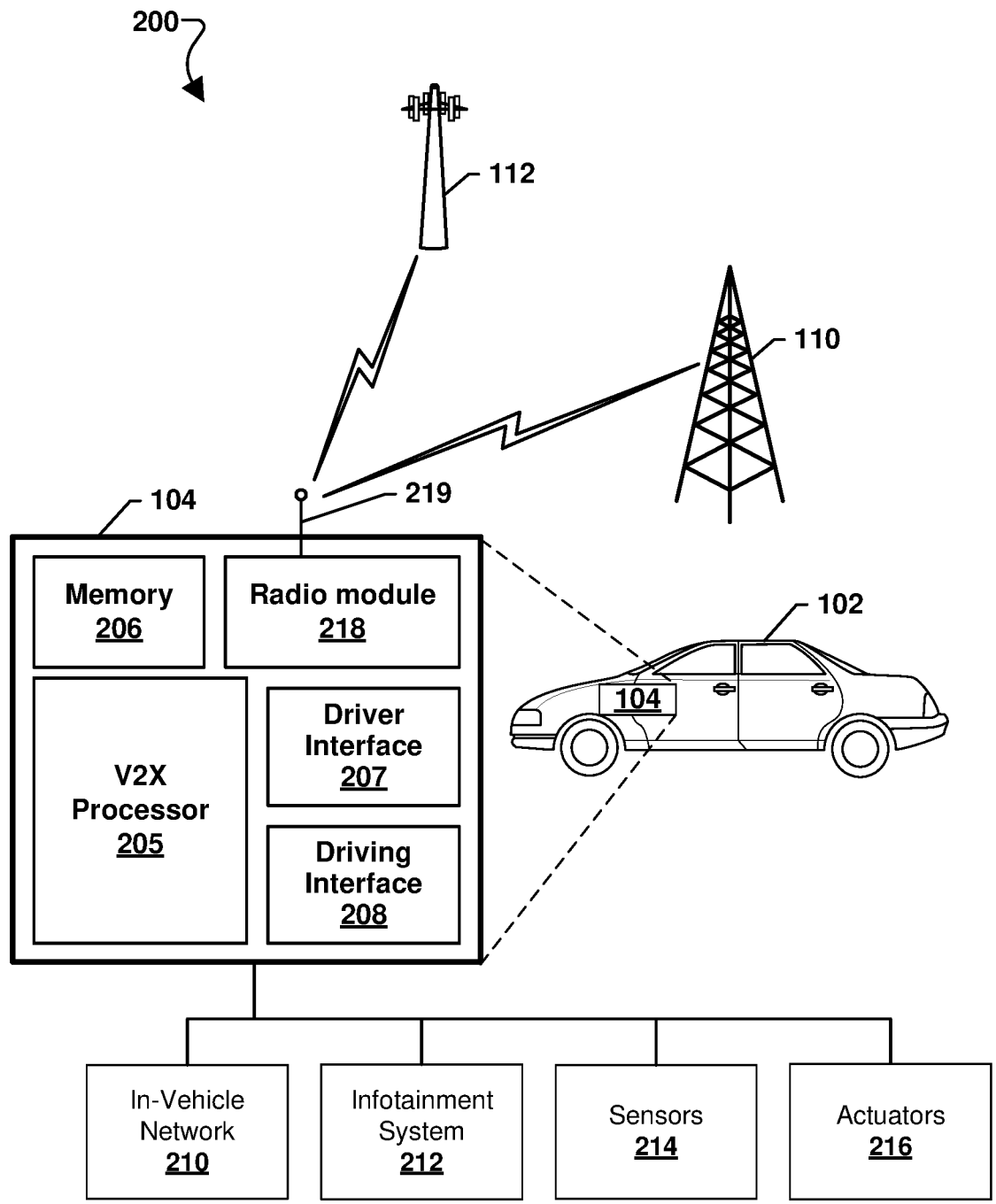
FIG. 2A is a component diagram of an example vehicle V2X communication system suitable for implementing various embodiments.

FIG. 2A is a component diagram of an example communication system 200 including a suitable for implementing various embodiments. With reference to FIGS. 1A-2A, the system 200 may include a vehicle 102 that includes a V2X communication system 104. The vehicle V2X communication system 104 may communicate with various systems and devices, such as an in-vehicle network 210, an infotainment system 212, various sensors 214, various actuators 216, and a radio module 218 coupled to an antenna 219. The vehicle V2X communication system 104 also may communicate with roadside units 112, cellular communication network base stations 110, and other external devices.

The V2X communication system 104 may include a processor 205, memory 206, an input module 207, an output module 208 and the radio module 218. The processor 205 may be coupled to the memory 206 (i.e., a non-transitory storage medium), and may be configured with processor-executable instructions stored in the memory 206 to perform operations of the methods according to various embodiments described herein. Also, the processor 205 may be coupled to the output module 208, which may control in-vehicle displays, and to the input module 207 to receive information from vehicle sensors as well as driver inputs.

The V2X communication system 104 may include a V2X antenna 219 coupled to the radio module 218 that is configured to communicate with one or more ITS participants (e.g., stations), a roadside unit 112, and a base station 110 or another suitable network access point. The V2X antenna 219 and radio module 218 may be configured to receive dynamic traffic flow feature information via vehicle-to-everything (V2X) communications. In various embodiments, the V2X communication system may receive information from a plurality of information sources, such as the in-vehicle network 210, infotainment system 212, various sensors 214, various actuators 216, and the radio module 218. The V2X communication system may be configured to perform autonomous or semi-autonomous driving functions using map data in addition to sensor data, as further described below.

Examples of an in-vehicle network 210 include a Controller Area Network (CAN), a Local Interconnect Network (LIN), a network using the FlexRay protocol, a Media Oriented Systems Transport (MOST) network, and an Automotive Ethernet network. Examples of vehicle sensors 214 include a location determining system (such as a Global Navigation Satellite Systems (GNSS) system, a camera, radar, lidar, ultrasonic sensors, infrared sensors, and other suitable sensor devices and systems. Examples of vehicle actuators 216 include various physical control systems such as for steering, brakes, engine operation, lights, directional signals, and the like.

Figure 2B:
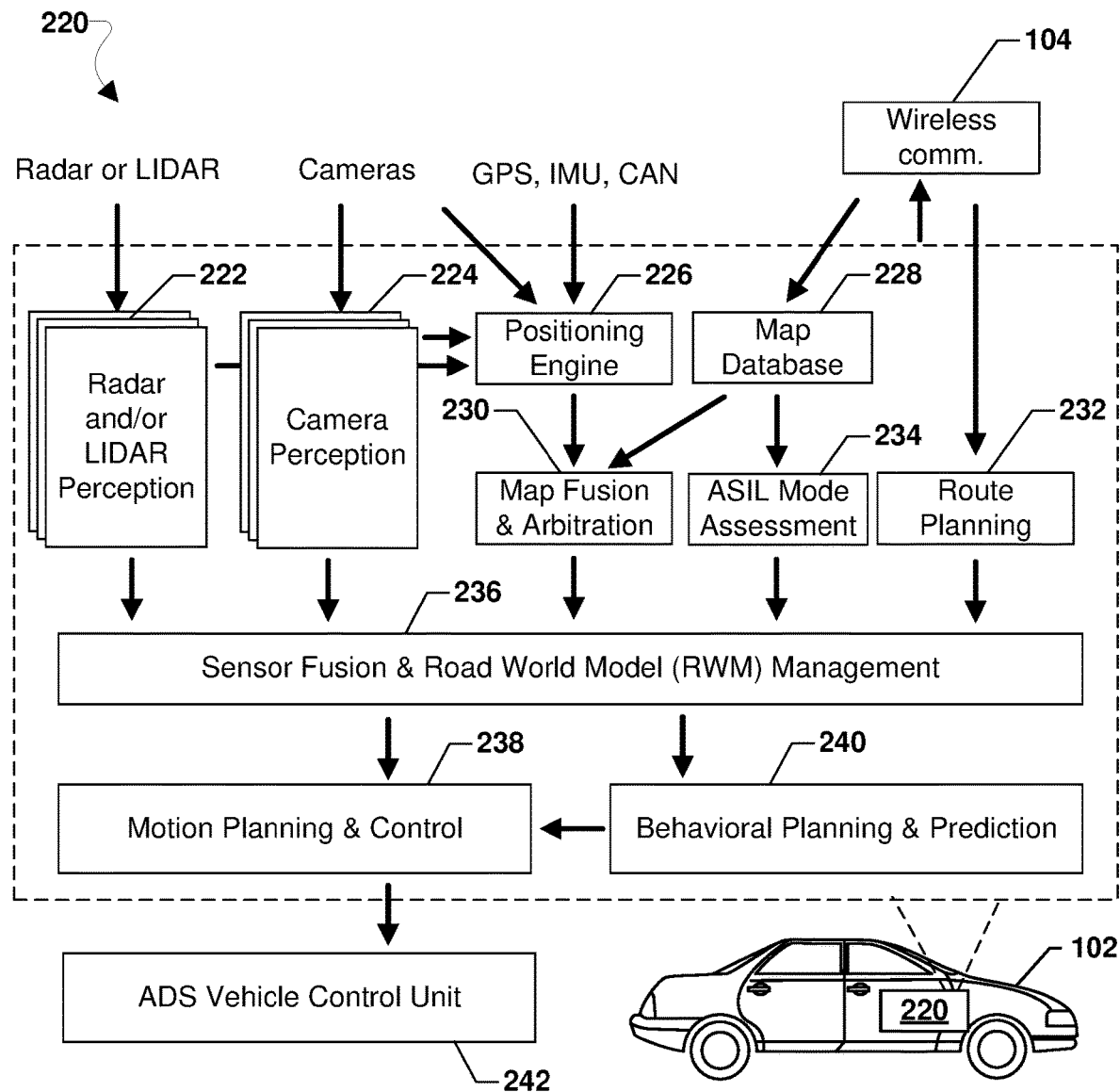
FIG. 2B is a component block diagram illustrating components of an example vehicle autonomous/semi-autonomous driving system V2X communication system suitable for implementing various embodiments.

FIG. 2B is a component block diagram illustrating components of an example vehicle autonomous/semiautonomous driving system 220, which may be coupled to the V2X communication system 104 and suitable for implementing various embodiments. The autonomous/semiautonomous driving system 220 may include various subsystems, communication elements, computational elements, computing devices or units which may be utilized within a vehicle 102. With reference to FIGS. 1A-2A, the various computational elements, computing devices or units within the autonomous/semiautonomous driving system 220 may be implemented within a system of computing devices (i.e., subsystems) that communicate data and commands to each other via the in-vehicle network 210 (e.g., indicated by the arrows in FIG. 2B). In some implementations, the various computational elements, computing devices or units within the autonomous/semiautonomous driving system 220 may be implemented within a single computing device, such as separate threads, processes, algorithms or computational elements. Therefore, each subsystem/computational element illustrated in FIG. 2B is also generally referred to herein as a "layer" within a computational "stack" that constitutes the vehicle autonomous/semiautonomous driving system 220. However, the use of the terms layer and stack in describing various embodiments are not intended to imply or require that the corresponding functionality is implemented within a single vehicle computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

The autonomous/semiautonomous driving system 220 may include a radar and/or lidar perception layer 222, a camera perception layer 224, a positioning engine layer 226, a map database 228, a map fusion and arbitration layer 230, a route planning layer 232, an operating mode assessment layer 234, a sensor fusion and road world model (RWM) management layer 236, a motion planning and control layer 238, and a behavioral planning and prediction layer 240. The layers 222-240 are merely examples of some layers in one example configuration of the autonomous/semiautonomous driving system 220. In other configurations, other layers may be included, such as additional layers for other perception sensors (e.g., a lidar perception layer, etc.), additional layers for planning and/or control, additional layers for modeling, etc., and/or certain of the layers 222-240 may be excluded from the autonomous/semiautonomous driving system 220. Each of the layers 222-240 may exchange data, computational results and commands as illustrated by the arrows in FIG. 2B. Further, the autonomous/semiautonomous driving system 220 may receive and process data from sensors (e.g., radar, lidar, cameras, inertial measurement units (IMU) etc.), navigation information sources (e.g., Global Positioning System (GPS) receivers, IMUs, etc.), vehicle networks (e.g., Controller Area Network (CAN) bus), and databases in memory (e.g., digital map data). The autonomous/semiautonomous driving system 220 may output vehicle control commands or signals to an autonomous driving system (ADS) vehicle control unit 242, which is a system, subsystem or computing device that interfaces directly with vehicle steering, throttle and brake controls. The configuration of the autonomous/semiautonomous driving system 220 and ADS vehicle control unit 242 illustrated in FIG. 2A is merely an example configuration and other configurations of a vehicle management system and other vehicle components may be used. As an example, the configuration of the autonomous/semiautonomous driving system 220 and ADS vehicle control unit 242 illustrated in FIG. 2B may be used in a vehicle configured for autonomous or semi-autonomous operation while a different configuration may be used in a non-autonomous vehicle.

The radar and/or lidar perception layer 222 may receive data from one or more detection and ranging sensors, such as radar (e.g., 132) and/or lidar (e.g., 138), and process the data to recognize and determine locations of other vehicles and objects within a vicinity of the vehicle 100. The radar perception layer 222 may include use of neural network processing and artificial intelligence methods to recognize objects and vehicles and pass such information on to the sensor fusion and RWM management layer 236.

The camera perception layer 224 may receive data from one or more cameras, such as cameras, and process the data to recognize and determine locations of other vehicles and objects within a vicinity of the vehicle 100. The camera perception layer 224 may include use of neural network processing and artificial intelligence methods to recognize objects and vehicles and pass such information on to the sensor fusion and RWM management layer 236.

The positioning engine layer 226 may receive data from the radar and/or lidar perception layer 222, the camera perception layer 224, and various sources of navigation information, and process the data and information to determine a position of the vehicle 100. Various sources of navigation information may include, but is not limited to, a GPS receiver, an IMU, and/or other sources and sensors connected via a CAN bus. The positioning engine layer 226 may also utilize inputs from one or more cameras, such as cameras and/or any other available sensor capable of identifying and determining directions and distances to objects in the vicinity of the vehicle, such as radars, lidars, etc.

The autonomous/semiautonomous driving system 220 may include or be coupled to a vehicle V2X communication system 104 according to various embodiments. One or more of the layers 222-240 may provide information to or receive information from the V2X communication system 104. The V2X communication system 104 may be configured to communicate with highway communication systems, such as via V2X communication links (e.g., 124) and/or to remote information sources (e.g., computing device 132) via cellular wireless communication links (e.g., 122), such as via 5G cellular networks.

The map fusion and arbitration layer 230 may access the map database 228 for location information regarding nearby objects and features, and receive localizing/navigation information output from the positioning engine layer 226, and process the data to further determine the position of the vehicle 102 within the map, such as location within a lane of traffic, position within a street map, etc. sensor data may be stored in a memory (e.g., memory 312).

Similar to location information in some map objects and features and sensor accuracy and precision, GPS position fixes include some error, so the map fusion and arbitration layer 230 may function to determine a best guess location of the vehicle within a roadway based upon an arbitration between the GPS coordinates, sensor data, and map data regarding objects and features in and near the roadway. For example, while GPS coordinates may place the vehicle near the middle of a two-lane road in the sensor data, the map fusion and arbitration layer 230 may determine from the direction of travel that the vehicle is most likely aligned with the travel lane consistent with the direction of travel. The map fusion and arbitration layer 230 may pass arbitrated map location information to the sensor fusion and RWM management layer 236.

The route planning layer 232 may utilize sensor data, as well as inputs from an operator or dispatcher to plan a route to be followed by the vehicle 102 to a particular destination. The route planning layer 232 may pass map-based location information to the sensor fusion and RWM management layer 236. However, the use of a prior map by other layers, such as the sensor fusion and RWM management layer 236, etc., is not required. For example, other stacks may operate and/or control the vehicle based on perceptual data alone without a provided map, constructing lanes, boundaries, and the notion of a local map as perceptual data is received.

In embodiments including an operating mode assessment layer 234, that processing layer may use safety and/or confidence information regarding nearby objects and features to select an appropriate ADS driving mode. In some embodiments, the operating mode assessment layer 234 may determine whether the current autonomous or semi-autonomous driving mode is consistent with or appropriate in view of safety and/or confidence information regarding nearby objects and features in the driving environment.

The sensor fusion and RWM management layer 236 may receive data and outputs produced by the radar and/or lidar perception layer 222, camera perception layer 224, map fusion and arbitration layer 230, route planning layer 232, and the operating mode assessment layer 234, and use some or all of such inputs to estimate or refine the location and state of the vehicle 102 in relation to the road, other vehicles on the road, and other objects within a vicinity of the vehicle 100. For example, the sensor fusion and RWM management layer 236 may combine imagery data from the camera perception layer 224 with arbitrated map location information from the map fusion and arbitration layer 230 to refine the determined position of the vehicle within a lane of traffic. As another example, the sensor fusion and RWM management layer 236 may combine object recognition and imagery data from the camera perception layer 224 with object detection and ranging data from the radar and/or lidar perception layer 222 to determine and refine the relative position of other vehicles and objects in the vicinity of the vehicle. As another example, the sensor fusion and RWM management layer 236 may receive information from V2X communications (such as via the CAN bus) regarding other vehicle positions and directions of travel and combine that information with information from the radar and/or lidar perception layer 222 and the camera perception layer 224 to refine the locations and motions of other vehicles. The sensor fusion and RWM management layer 236 may output refined location and state information of the vehicle 100, as well as refined location and state information of other vehicles and objects in the vicinity of the vehicle, to the motion planning and control layer 238 and/or the behavior planning and prediction layer 240.

As a further example, the sensor fusion and RWM management layer 236 may use dynamic traffic control instructions directing the vehicle 102 to change speed, lane, direction of travel, or other navigational element(s), and combine that information with other received information to determine refined location and state information. The sensor fusion and RWM management layer 236 may output the refined location and state information of the vehicle 102, as well as refined location and state information of other vehicles and objects in the vicinity of the vehicle 100, to the motion planning and control layer 238, the behavior planning and prediction layer 240 and/or devices remote from the vehicle 102, such as a data server, other vehicles, etc., via wireless communications, such as through C-V2X connections, other wireless connections, etc.

As a still further example, the sensor fusion and RWM management layer 236 may monitor perception data from various sensors, such as perception data from a radar and/or lidar perception layer 222, camera perception layer 224, other perception layer, etc., and/or data from one or more sensors themselves to analyze conditions in the vehicle sensor data. The sensor fusion and RWM management layer 236 may be configured to detect conditions in the sensor data, such as sensor measurements being at, above, or below a threshold, certain types of sensor measurements occurring, etc., and may output the sensor data as part of the refined location and state information of the vehicle 102 provided to the behavior planning and prediction layer 240 and/or devices remote from the vehicle 100, such as a data server, other vehicles, etc., via wireless communications, such as through C-V2X connections, other wireless connections, etc.

The behavioral planning and prediction layer 240 of the autonomous vehicle V2X communication system 220 may use the refined location and state information of the vehicle 102 and location and state information of other vehicles and objects output from the sensor fusion and RWM management layer 236 to predict future behaviors of other vehicles and/or objects. For example, the behavioral planning and prediction layer 240 may use such information to predict future relative positions of other vehicles in the vicinity of the vehicle based on own vehicle position and velocity and other vehicle positions and velocity. Such predictions may take into account information from the map data and route planning to anticipate changes in relative vehicle positions as host and other vehicles follow the roadway. The behavioral planning and prediction layer 240 may output other vehicle and object behavior and location predictions to the motion planning and control layer 238. Additionally, the behavior planning and prediction layer 240 may use object behavior in combination with location predictions to plan and generate control signals for controlling the motion of the vehicle 102. For example, based on route planning information, refined location in the roadway information, and relative locations and motions of other vehicles, the behavior planning and prediction layer 240 may determine that the vehicle 102 needs to change lanes and accelerate, such as to maintain or achieve minimum spacing from other vehicles, and/or prepare for a turn or exit. As a result, the behavior planning and prediction layer 240 may calculate or otherwise determine a steering angle for the wheels and a change to the throttle setting to be commanded to the motion planning and control layer 238 and ADS vehicle control unit 242 along with such various parameters necessary to effectuate such a lane change and acceleration. One such parameter may be a computed steering wheel command angle.

The motion planning and control layer 238 may receive data and information outputs from the sensor fusion and RWM management layer 236, map data from the map database 232, and other vehicle and object behavior as well as location predictions from the behavior planning and prediction layer 240, and use this information to plan and generate control signals for controlling the motion of the vehicle 102 and to verify that such control signals meet safety requirements for the vehicle 100. For example, based on route planning information, refined location in the roadway information, and relative locations and motions of other vehicles, the motion planning and control layer 238 may verify and pass various control commands or instructions to the ADS vehicle control unit 242.

The ADS vehicle control unit 242 may receive the commands or instructions from the motion planning and control layer 238 and translate such information into mechanical control signals for controlling wheel angle, brake and throttle of the vehicle 100. For example, ADS vehicle control unit 242 may respond to the computed steering wheel command angle by sending corresponding control signals to the steering wheel controller.

In various embodiments, the V2X communication system 104 may communicate with other V2X communication system participants (e.g., other vehicles 12, 14, 16) via wireless communication links to transmit sensor data, position data, vehicle data and data gathered about the environment around the vehicle by onboard sensors. Such information may be used by other V2X communication system participants to update stored sensor data for relay to other V2X communication system participants.

In various embodiments, the vehicle V2X communication system 220 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 240 (or in a separate layer) may determine the current or future separate distance between another vehicle (as defined by the sensor fusion and RWM management layer 236) and the vehicle (e.g., based on the world model refined by the sensor fusion and RWM management layer 236), compare that separation distance to a safe separation distance parameter stored in memory, and issue instructions to the motion planning and control layer 238 to speed up, slow down or turn if the current or predicted separation distance violates the safe separation distance parameter. As another example, safety or oversight functionality in the motion planning and control layer 238 (or a separate layer) may compare a determined or commanded steering wheel command angle to a safe wheel angle limit or parameter and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 3A:
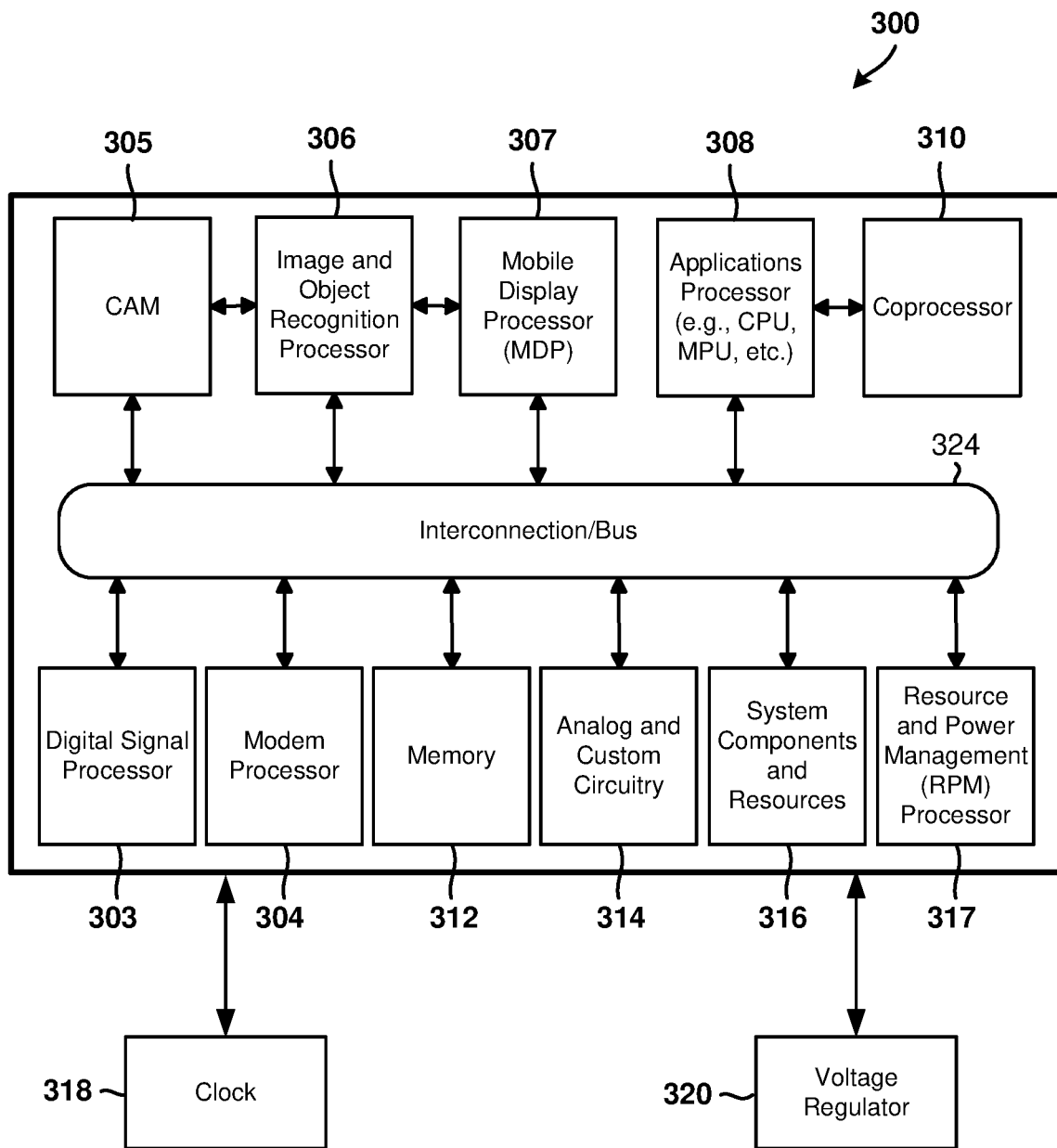
FIG. 3A is a block diagram illustrating components of a system on chip for use in a vehicle V2X communication system in accordance with various embodiments.

FIG. 3A is a block diagram illustrating example components of a system on chip (SOC) 300 for use in a vehicle V2X processing system in accordance with various embodiments. With reference to FIGS. 1A-3A, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras via the CAM 305 to recognize and/or identify other vehicles, and otherwise perform functions of the camera perception layer 224 as described. In some embodiments, the processor 306 may be configured to process radar or lidar data and perform functions of the radar and/or lidar perception layer 222 as described.

The system components and resources 316, analog and custom circuitry 314, and/or CAM 305 may include circuitry to interface with peripheral devices, such as cameras, radar, lidar, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 3B:
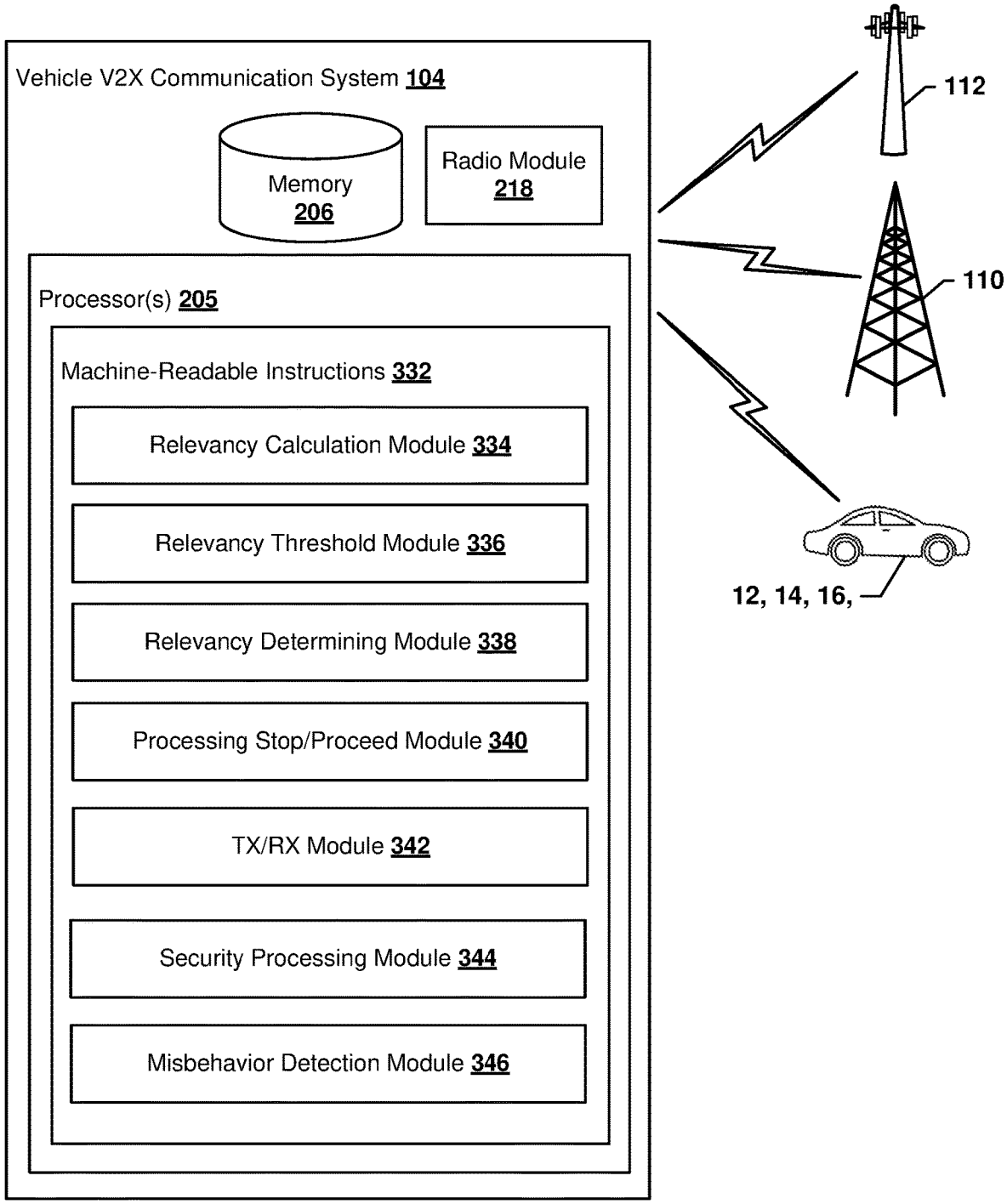
FIG. 3B is a component block diagram illustrating elements of a vehicle V2X communication system configured in accordance with various embodiments

FIG. 3B is a component block diagram illustrating elements of a vehicle V2X communication system 104 configured in accordance with various embodiments. With reference to FIGS. 1A-3B, the V2X communication system 104 of a vehicle (e.g., 102) may be configured to communicate with a roadside unit 112, a cellular network base station 110, and/or one or more other vehicles 12, 14, 16.

The vehicle V2X communication system 104 may include one or more processors 205, memory 206, a radio module 218, and other components. The vehicle processing system 104 may include a plurality of hardware, software, and/or firmware components operating together to provide the functionality attributed herein to the processor 205.

The memory 206 may include non-transitory storage media that electronically stores information. The electronic storage media of memory 206 may include one or both of system storage that is provided integrally (i.e., substantially non-removable) with the vehicle processing system 104 and/or removable storage that is removably connectable to the vehicle V2X communication system 104 via, for example, a port (e.g., a universal serial bus (USB) port, a firewire port, etc.) or a drive (e.g., a disk drive, etc.). In various embodiments, memory 206 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. The memory 206 may include one or more virtual storage resources (e.g., cloud storage, a virtual private network, and/or other virtual storage resources). Memory 206 may store software algorithms, information determined by processor(s) 205, information received from the one or more other vehicles 12, 14, 16, information received from the roadside unit 112, information received from the base station 110, and/or other information that enables the vehicle V2X communication system 104 to function as described herein.

The processor(s) 205 may include one of more local processors that may be configured to provide information processing capabilities in the vehicle V2X communication system 104. As such, the processor(s) 205 may include one or more of a digital processor, an analog processor, a digital circuit designed to process information, an analog circuit designed to process information, a state machine, and/or other mechanisms for electronically processing information. Although the processor(s) 205 is shown in FIG. 3B as a single entity, this is for illustrative purposes only. In some embodiments, the processor(s) 205 may include a plurality of processing units. These processing units may be physically located within the same device, or the processor(s) 205 may represent processing functionality of a plurality of devices distributed in the vehicle and operating in coordination.

The vehicle V2X communication system 104 may be configured by machine-readable instructions 332, which may include one or more instruction modules. The instruction modules may include computer program modules. In various embodiments, the instruction modules may include one or more of a relevancy calculation module 334, a relevancy threshold module 336, a relevancy determining module 338, a processing stop/proceed module 340, a transmit/receive (TX/RX) module 342, a security processing module 344, a misbehavior detection module 346, and/or other modules.

The relevancy calculation module 334 may be configured to calculate a relevancy value of a received BSM prior to conducting security processing of the BSM. The relevancy calculation module 334 may be configured to calculate the relevancy value based on an inverse time-to-collision of the vehicle and the sender of the BSM. The relevancy calculation module 334 may be configured to calculate the relevancy value based on a relative speed of the vehicle and the sender of the BSM divided by a distance from the vehicle to the sender of the BSM.

The relevancy threshold module 336 may be configured to determine the relevancy threshold based on a processing capability of the V2X communication system and a maneuvering capability of the vehicle. The relevancy threshold module 336 may be configured to determine the relevancy threshold based on a reaction time of the V2X communication system and/or a vehicle autonomous/semiautonomous driving system and a braking time of the vehicle.

The relevancy determining module 338 may be configured to determining whether the relevancy value of the BSM meets the relevancy threshold.

The processing stop/proceed module 340 may be configured to stop processing of the BSM in response to determining that the relevancy value of the BSM does not meet the relevancy threshold. The processing stop/proceed module 340 may be configured to conduct security processing of the BSM and performing one or more misbehavior detection operations on the BSM in response to determining that the relevancy value of the BSM meets the relevancy threshold The TX/RX module 342 may be configured to control the operations of communication devices of the vehicle processing system such as the radio module 218.

The security processing module 344 may be configured to perform security processing of the BSM in response to determining that the relevancy value of the BSM meets the relevancy threshold. The security processing module 344 may be configured to perform a cryptographic validation of the BSM in response to determining that the relevancy value of the BSM meets the relevancy threshold.

The misbehavior detection module 346 may be configured to perform misbehavior detection of the BSM in response to determining that the relevancy value of the BSM meets the relevancy threshold. The misbehavior detection module 346 may be configured to perform a semantic validation of the BSM, The processor(s) 205 may be configured to execute the modules 332-346 and/or other modules by software, hardware, firmware, some combination of software, hardware, and/or firmware, and/or other mechanisms for configuring processing capabilities on processor(s) 205.

The description of the functionality provided by the different modules 332-346 is for illustrative purposes, and is not intended to be limiting, as any of modules 332-346 may provide more or less functionality than is described. For example, one or more of modules 332-346 may be eliminated, and some or all of its functionality may be provided by other ones of modules 332-346. As another example, processor(s) 205 may be configured to execute one or more additional modules that may perform some or all of the functionality attributed below to one of modules 332-346.

Figure 4A:
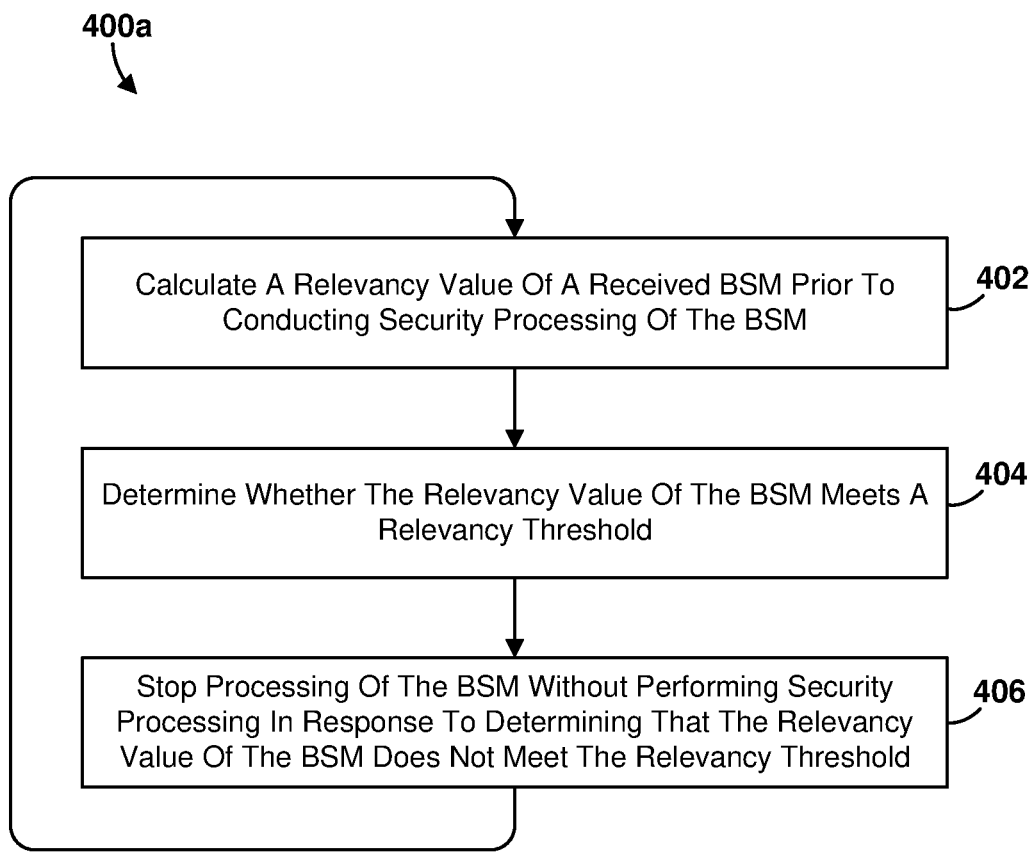
FIG. 4A is a process flow diagram of an example method performed by a processor of a vehicle V2X communication system for managing transmission of misbehavior reports in accordance with various embodiments.

FIG. 4A is a process flow diagram of an example method 400a performed by a processor of a vehicle V2X communication system for managing transmission of misbehavior reports in accordance with various embodiments. With reference to FIGS. 1A-4A, the method 400a may be performed by a processor (e.g., 205, 300) of a V2X communication system or other vehicle processor (e.g., 205, 220, 300) that may be implemented in hardware elements, software elements, or a combination of hardware and software elements (referred to collectively as a "vehicle processor").

In block 402, the processor may calculate a relevancy value of a received BSM prior to conducting security processing of the BSM. In some embodiments, calculating a relevancy value for the received BSM may include calculating the relevancy value based on an inverse time-to-collision of the vehicle and the sender of the BSM. In some embodiments, calculating a relevancy value for the received BSM may include calculating the relevancy value based on a relative speed of the vehicle and the sender of the BSM divided by a distance from the vehicle to the sender of the BSM. Means for performing the operations of block 402 may include the processor (e.g., 205, 303, 304, 306, 307, 308, 310) executing the relevancy calculation module 334.

In block 404, the processor may determine whether the relevancy value of the BSM meets a relevancy threshold. In some embodiments, as part of the operations in block 404 the vehicle processor may determine the relevancy threshold based on a processing capability of the V2X communication system, an autonomous/semiautonomous driving system and/or a maneuvering capability of the vehicle. In some embodiments, as part of the operations in block 404 the processor may determine the relevancy threshold based on a reaction time of the V2X communication system, an autonomous/semiautonomous driving system and/or a braking time of the vehicle. Means for performing the operations of block 404 may include the processor (e.g., 205, 303, 304, 306, 307, 308, 310) executing the relevancy determining module 338.

In block 406, in some embodiments, the processor may stop processing of the BSM without performing security processing in response to determining that the relevancy value of the BSM does not meet the relevancy threshold. By suspending processing of the BSM, and in some embodiments deleting the BSM, without performing security processing, the vehicle processor can avoid committing the processing resources and time required to validate and verify a BSM that will be of little if any relevance to the vehicle. Means for performing the operations of block 406 may include the processor (e.g., 205, 303, 304, 306, 307, 308, 310) executing the processing stop/proceed module 340.

The vehicle processor may repeat the operations of blocks 402-406 from time to time, such as when the vehicle processor receives a new BSM from a sender of the BSM.

Figure 4B:
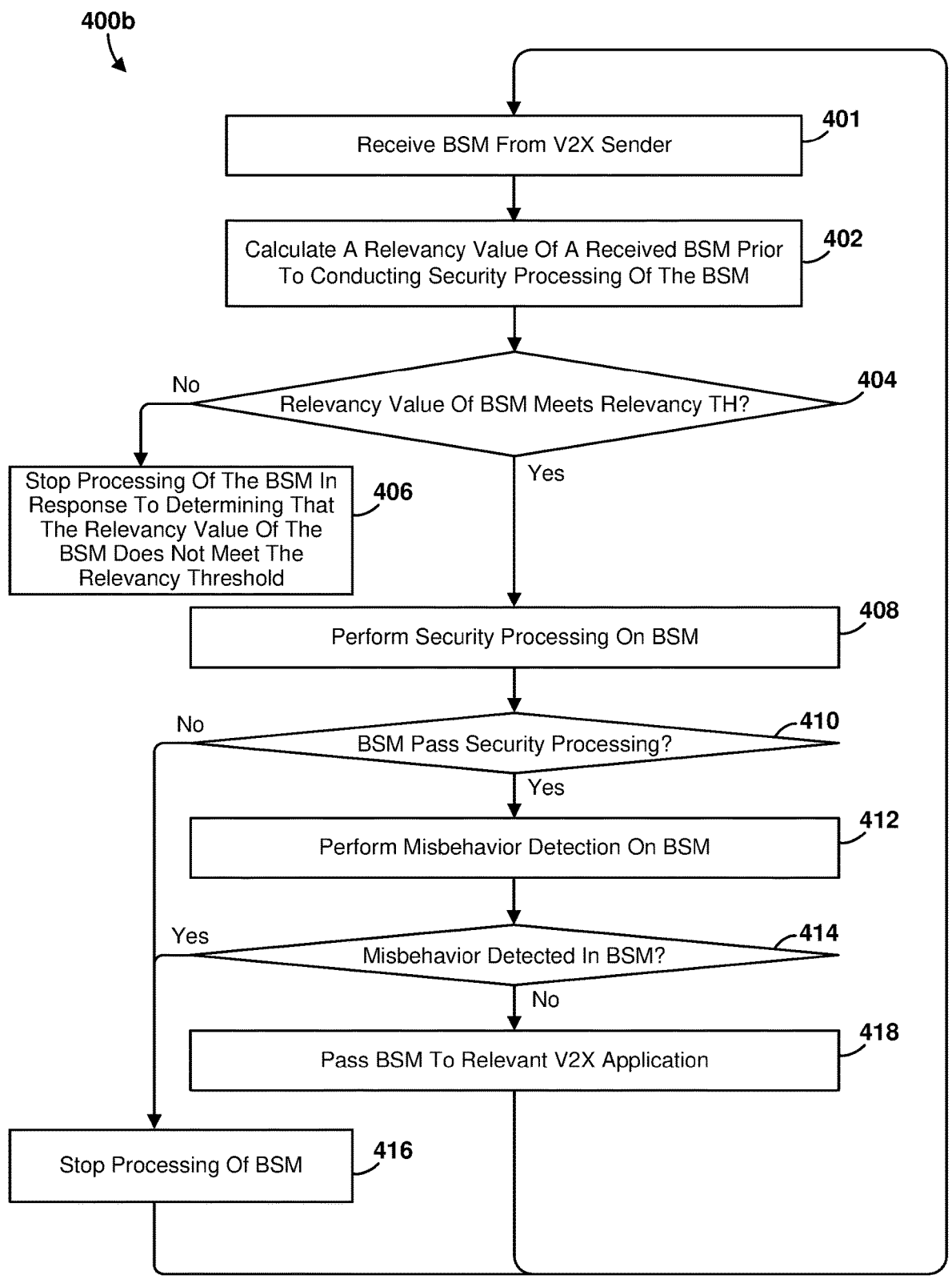
FIG. 4B is a process flow diagram of example operations that may be performed by a processor of a vehicle V2X communication system as part of methods for managing transmission of misbehavior reports in accordance with various embodiments.

FIG. 4B is a process flow diagram of example operations 400b that may be performed by a processor of a vehicle V2X communication system as part of the method 400a for managing transmission of misbehavior reports in accordance with various embodiments. With reference to FIGS. 1A-4B, the operations 400b may be performed by a processor (e.g., 205, 300) of a V2X communication system or other vehicle processor (e.g., 104205, 220, 300) that may be implemented in hardware elements, software elements, or a combination of hardware and software elements (referred to collectively as a "vehicle processor").

In block 401, the processor may receive a BSM from a sender of the BSM. Means for performing the operations of block 401 may include the processor (e.g., 205, 303, 304, 306, 307, 308, 310) executing the TX/RX module 342 and the radio module 218.

In block 402, the processor may calculate a relevancy value of a received BSM prior to conducting security processing of the BSM as described.

In determination block 404, the processor may determine whether the relevancy value of the BSM meets a relevancy threshold as described. Means for performing the operations of block 404 may include the processor (e.g., 205, 303, 304, 306, 307, 308, 310) executing the relevancy determining module 338.

In response to determining that the relevancy value of the BSM does not meet the relevancy threshold (i.e., determination block 404="No"), the vehicle processor may stop processing of the BSM without performing security processing in block 406 as described.

In response to determining that the relevancy value of the BSM meets the relevancy threshold (i.e., determination block 404="Yes"), the processor may perform security processing on the BSM in block 408. In some embodiments the security processing may include performing a cryptographic validation of the BSM. Means for performing the operations of block 408 may include the processor (e.g., 205, 303, 304, 306, 307, 308, 310) executing the security processing module 344.

In determination block 410, the processor may determine whether the BSM passes security processing. Means for performing the operations of determination block 410 may include the processor (e.g., 205, 303, 304, 306, 307, 308, 310) executing the security processing module 344.

In response to determining that the BSM does not pass security processing (i.e., determination block 410="No"), the processor may stop processing the BSM in block 416. Means for performing the operations of block 416 may include the processor (e.g., 205, 303, 304, 306, 307, 308, 310) executing the processing stop/proceed module 340.

In response to determining that the BSM passes security processing (i.e., determination block 410="Yes"), the processor may perform misbehavior detection on the BSM in block 412. Means for performing the operations of block 412 may include the processor (e.g., 205, 303, 304, 306, 307, 308, 310) executing the misbehavior detection module 346.

In determination block 414, the processor may determine whether misbehavior is detected in the BSM. Means for performing the operations of determination block 414 may include the processor (e.g., 205, 303, 304, 306, 307, 308, 310) executing the misbehavior detection module 346.

In response to determining that misbehavior is detected in the BSM (i.e., determination block 414="Yes"), the processor may stop processing the BSM in block 416. Means for performing the operations of block 416 may include the processor (e.g., 205, 303, 304, 306, 307, 308, 310) executing the processing stop/proceed module 340.

In response to determining that misbehavior is not detected in the BSM (i.e., determination block 414="No"), the processor may pass the BSM to a relevant V2X application in block 418. The V2X application may use information in the BSM to perform various vehicle operations. Means for performing the operations of block 418 may include the processor (e.g., 205, 303, 304, 306, 307, 308, 310).

The vehicle processor may repeat the operations of blocks 401-418 from time to time, such as when the processor receives a new BSM from a sender of the BSM.

Figure 5:
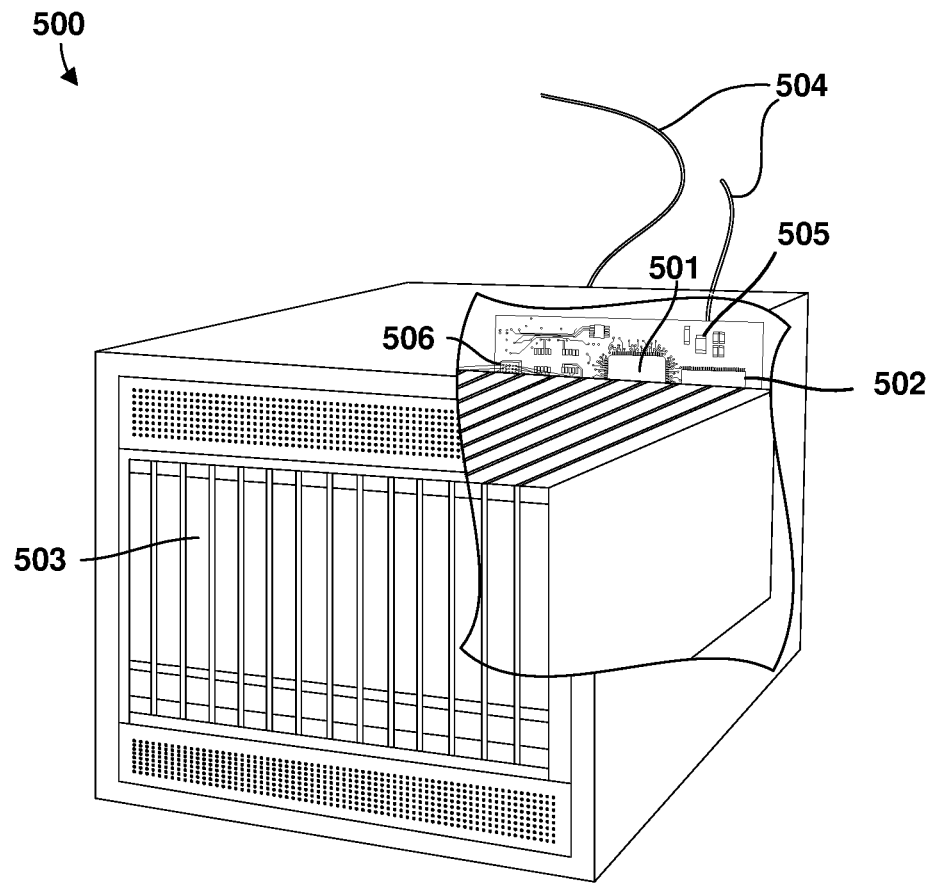
FIG. 5 is a component block diagram of a computing device suitable for use with various embodiments.

FIG. 5 is a component block diagram of a network computing device 500 suitable for use with various embodiments. With reference to FIGS. 1A-5, various embodiments may be implemented on a variety of computing devices, an example of which is illustrated in FIG. 5 in the form of a server device. A network computing device 500 may include a processor 501 coupled to volatile memory 502 and a large capacity nonvolatile memory, such as a disk drive 503. The network computing device 500 may also include a peripheral memory access device such as a floppy disc drive, compact disc (CD) or digital video disc (DVD) drive 506 coupled to the processor 501. The network computing device 500 may also include network access ports 504 (or interfaces) coupled to the processor 501 for establishing data connections with a network, such as the Internet and/or a local area network coupled to other system computers and servers. The network computing device 500 may include one or more transceivers 505 for sending and receiving electromagnetic radiation that may be connected to a wireless communication link. The network computing device 500 may include additional access ports, such as USB, Firewire, Thunderbolt, and the like for coupling to peripherals, external memory, or other devices.

Implementation examples are described in the following paragraphs. While some of the following implementation examples are described in terms of example methods, further example implementations may include: the example methods discussed in the following paragraphs implemented by a V2X communication system that may be an on-board unit, mobile device unit, or mobile computing unit including a processor configured with processor-executable instructions to perform operations of the methods of the following implementation examples; the example methods discussed in the following paragraphs implemented by a vehicle V2X communication system including means for performing functions of the methods of the following implementation examples; and the example methods discussed in the following paragraphs may be implemented as a non-transitory processor-readable storage medium having stored thereon processor-executable instructions configured to cause a processor of a V2X communication system to perform the operations of the methods of the following implementation examples.

Example 1. A method performed by a processor of a vehicle-to-everything (V2X) communication system of a vehicle for managing processing of a basic safety message (BSM), including calculating a relevancy value of a received BSM prior to conducting security processing of the BSM, determining whether the relevancy value of the BSM meets a relevancy threshold, and stopping processing of the BSM without performing security processing in response to determining that the relevancy value of the BSM does not meet the relevancy threshold.

Example 2. The method of example 1, further including performing security processing of the BSM and performing a misbehavior detection operation on the BSM in response to determining that the relevancy value of the BSM meets the relevancy threshold.

Example 3. The method of example 2, in which performing security processing of the BSM includes performing a cryptographic validation of the BSM.

Example 4. The method of example 2, in which performing a misbehavior detection operation on the BSM includes performing a semantic validation of the BSM.

Example 5. The method of any of examples 1-4, in which calculating a relevancy value for the received BSM includes calculating the relevancy value based on an inverse time-to-collision of the vehicle and a sender of the BSM.

Example 6. The method of any of examples 1-5, in which calculating a relevancy value for the received BSM includes calculating the relevancy value based on a relative speed of the vehicle and a sender of the BSM divided by a distance from the vehicle to the sender of the BSM.

Example 7. The method of any of examples 1-6, further including determining the relevancy threshold based on a processing capability of the V2X communication system and a maneuvering capability of the vehicle.

Example 8. The method of any of examples 1-7, further including determining the relevancy threshold based on a reaction time of the V2X communication system or an autonomous or semiautonomous driving system and a braking time of the vehicle.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a vehicle-to-everything (V2X) communication system of a vehicle for managing processing of basic safety messages (BSMs), comprising:
   calculating a relevancy value of a received first BSM based on a relative speed of the vehicle and a sender of the first BSM divided by a distance from the vehicle to the sender of the first BSM prior to conducting security processing of the first BSM;
   determining whether the relevancy value of the first BSM meets a relevancy threshold; and
   stopping processing of the first BSM without performing security processing in response to determining that the relevancy value of the first BSM does not meet the relevancy threshold.

2. The method of claim 1, further comprising:
   calculating a relevancy value of a received second BSM prior to conducting security processing of the second BSM;
   determining whether the relevancy value of the second BSM meets the relevancy threshold; and
   performing security processing of the second BSM and performing a misbehavior detection operation on the second BSM in response to determining that the relevancy value of the second BSM meets the relevancy threshold.

3. The method of claim 2, wherein performing security processing of the second BSM comprises performing a cryptographic validation of the second BSM.

4. The method of claim 2, wherein performing a misbehavior detection operation on the second BSM comprises performing a semantic validation of the second BSM.

5. The method of claim 1, wherein the relevancy value is calculated further based on an inverse time-to-collision of the vehicle and a sender of the first BSM.

6. The method of claim 1, further comprising determining the relevancy threshold based on a processing capability of the V2X communication system and a maneuvering capability of the vehicle.

7. The method of claim 1, further comprising determining the relevancy threshold based on a reaction time of the V2X communication system and a braking time of the vehicle.

8. A vehicle-to-everything (V2X) communication system of a vehicle, comprising:
   a processor configured with processor-executable instructions to:
      calculate a relevancy value of a received first BSM based on a relative speed of the vehicle and a sender of the first BSM divided by a distance from the vehicle to the sender of the first BSM prior to conducting security processing of the first BSM;
      determine whether the relevancy value of the first BSM meets a relevancy threshold; and
      stop processing of the first BSM without performing security processing in response to determining that the relevancy value of the first BSM does not meet the relevancy threshold.

9. The V2X communication system of claim 8, wherein the processor is further configured with processor-executable instructions to:
   calculate a relevancy value of a received second BSM prior to conducting security processing of the second BSM;
   determine whether the relevancy value of the second BSM meets the relevancy threshold; and
   perform security processing of the second BSM and perform a misbehavior detection operation on the second BSM in response to determining that the relevancy value of the second BSM meets the relevancy threshold.

10. The V2X communication system of claim 9, wherein the processor is further configured with processor-executable instructions to perform a cryptographic validation of the second BSM.

11. The V2X communication system of claim 9, wherein the processor is further configured with processor-executable instructions to perform a semantic validation of the second BSM.

12. The V2X communication system of claim 8, wherein the processor is further configured with processor-executable instructions to calculate the relevancy value further based on an inverse time-to-collision of the vehicle and a sender of the first BSM.

13. The V2X communication system of claim 8, wherein the processor is further configured with processor-executable instructions to determine the relevancy threshold based on a processing capability of the V2X communication system and a maneuvering capability of the vehicle.

14. The V2X communication system of claim 8, wherein the processor is further configured with processor-executable instructions to determine the relevancy threshold based on a reaction time of the V2X communication system and a braking time of the vehicle.

15. A non-transitory processor-readable medium having stored thereon processor-executable instructions configured to cause a processor of a vehicle-to-everything (V2X) communication system of a vehicle to perform operations comprising:
   calculating a relevancy value of a received first BSM based on a relative speed of the vehicle and a sender of the first BSM divided by a distance from the vehicle to the sender of the first BSM prior to conducting security processing of the first BSM;

determining whether the relevancy value of the first BSM meets a relevancy threshold; and stopping processing of the first BSM without performing security processing in response to determining that the relevancy value of the first BSM does not meet the relevancy threshold.

16. The non-transitory processor-readable medium of claim 15, wherein the stored processor-executable instructions are further configured to cause the processor of the V2X communication system to:

calculate a relevancy value of a received second BSM prior to conducting security processing of the second BSM;

determine whether the relevancy value of the second BSM meets the relevancy threshold; and perform operations further comprising performing security processing of the second BSM and performing a misbehavior detection operation on the second BSM in response to determining that the relevancy value of the second BSM meets the relevancy threshold.

17. The non-transitory processor-readable medium of claim 16, wherein the stored processor-executable instructions are further configured to cause the processor of the V2X communication system to perform operations such that performing security processing of the second BSM comprises performing a cryptographic validation of the BSM.

18. The non-transitory processor-readable medium of claim 16, wherein the stored processor-executable instructions are further configured to cause the processor of the V2X communication system to perform operations such that performing a misbehavior detection operation on the second BSM comprises performing a semantic validation of the BSM.

19. The non-transitory processor-readable medium of claim 15, wherein the stored processor-executable instructions are further configured to cause the processor of the V2X communication system to perform operations such that calculating a relevancy value for the received BSM comprises calculating the relevancy value further based on an inverse time-to-collision of a vehicle including the V2X communication system and a sender of the first BSM.

20. The non-transitory processor-readable medium of claim 15, wherein the stored processor-executable instructions are further configured to cause the processor of the V2X communication system to perform operations further comprising determining the relevancy threshold based on a processing capability of the V2X communication system and a maneuvering capability of the vehicle.

21. The non-transitory processor-readable medium of claim 15, wherein the stored processor-executable instructions are further configured to cause the processor of the V2X communication system to perform operations further comprising determining the relevancy threshold based on a reaction time of the V2X communication system and a braking time of the vehicle.

* * * * *